April 5, 1966     A. G. BARKER     3,243,999
RAIN AND LIKE PRECIPITATION GAUGES

Filed Oct. 29, 1962     3 Sheets-Sheet 1

ALAN G. BARKER
INVENTOR.

BY
BUCKHORN, BLORE, KLARQUIST & SPARKMAN
ATTORNEYS

ALAN G. BARKER
INVENTOR.
BY
BUCKHORN, BLORE, KLARQUIST & SPARKMAN
ATTORNEYS

United States Patent Office 3,243,999
Patented Apr. 5, 1966

3,243,999
RAIN AND LIKE PRECIPITATION GAUGES
Alan George Barker, Burwood, Victoria, Australia, assignor to A. G. Barker & Associates Pty. Ltd., North Melbourne, Victoria, Australia
Filed Oct. 29, 1962, Ser. No. 233,695
10 Claims. (Cl. 73—171)

This invention relates to automatic measuring and recording rain or like precipitation measuring gauges.

In existing known types of automatic recording rain gauges it is necessary to constantly supervise them and to read them at frequent intervals so as to obtain accurate rainfall readings over long periods. If this is not done, such known types of automatic measuring instruments are liable to give inaccuracies in readings due either to overflowings or mechanical faults and these inaccuracies were difficult to correct.

The principal object of this invention is to produce an automatic measuring and recording rain or like precipitation gauge which may be left for long periods without inspection and which will give an accurate record of the rainfall irrespective of the amount of rain which has fallen.

A further object of the invention is to provide an automatic measuring and recording rain gauge which can register varying intensities of rainfall correctly and accurately.

A still further object of the invention is to provide an automatic measuring and recording rain gauge which can be read from a remote station thus allowing regular and frequency reading to be taken even during heavy rains or when it is difficult to obtain access to the site at which the gauge is mounted or has so been intentionally located.

With the above stated principal object in view an automatic measuring and recording rain or like precipitation gauge having a rain water collecting funnel arranged to deliver collected rain water to measuring containers mounted for alternate movement between water receiving positions and discharge positions, according to the present invention, is characterised by the provision of a counting mechanism actuatable by electrical impulses said counting mechanism being intermittently actuated by the closing of an electrical circuit by contact means associated with and operated by the movement of the measuring containers.

According to a further feature of the invention, there is provided a rain or like precipitation gauge of the type referred to characterised by the provision of a metering device positioned between the gauge collecting funnel or the like and the movable measuring containers and with said metering device being arranged so that only constant predetermined amounts of rain water or the like are intermittently delivered to the said measuring containers.

This arrangement ensures that regardless of the density of rainfall equal amounts of water passes to the measuring containers and enables the latter containers to be accurately set to register correctly for all rainfall intensities. The metering device ensures that the movable measuring containers are not subjected to varying pressures of water, and, consequently, for this reason, avoids the possibility of registering of errors arising from this cause.

According to a still further feature of the invention, the electrical impulses for actuating the counting mechanism may be simultaneously transmitted by signal conductor lines to a remote counter or indicating means at a base station whereby a reading from the gauge may be obtained or recorded without attending the gauge itself.

In order that the invention may be more readily understood reference will now be made to a preferred embodiment of a rain or like precipitation gauge constructed in accordance with the present invention. In these drawings.

Figure 1:
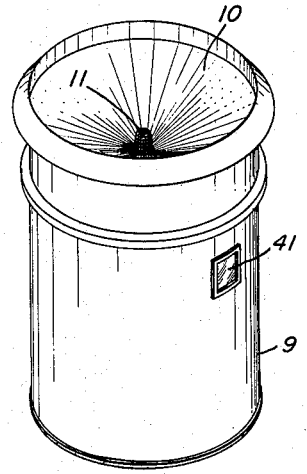
FIG. 1 is a perspective view of the rain or like precipitation gauge showing the collection funnel, casing for the measuring and metering equipment and inspection window for visual reading of the counting mechanism.

As illustrated in the drawings a casing 9 of conventional dimensions having a conventional rain collecting funnel 10 are provided and are preferably of usual dimensions to enable the rain gauge to be accommodated in positions that have been provided for gauges of this type. The collecting funnel 10 is provided with a gauze filter 11 across the discharge outlet 12 to prevent the entry or passage of insects or other foreign matter into recording mechanism included within the casing 9.

Figure 3:
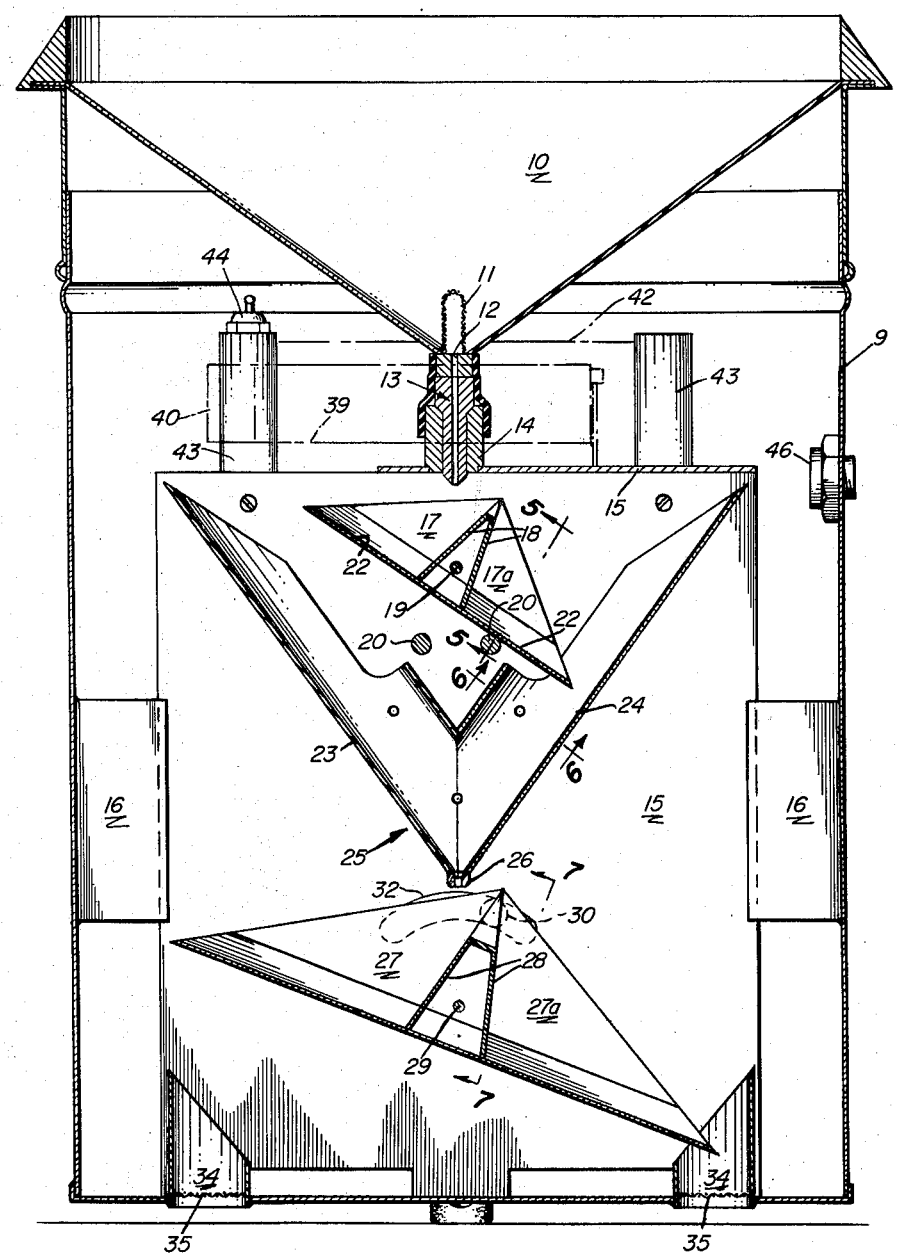
FIG. 3 is a section on line 3—3 of FIG. 2 with the collection funnel in position.
Figure 4:
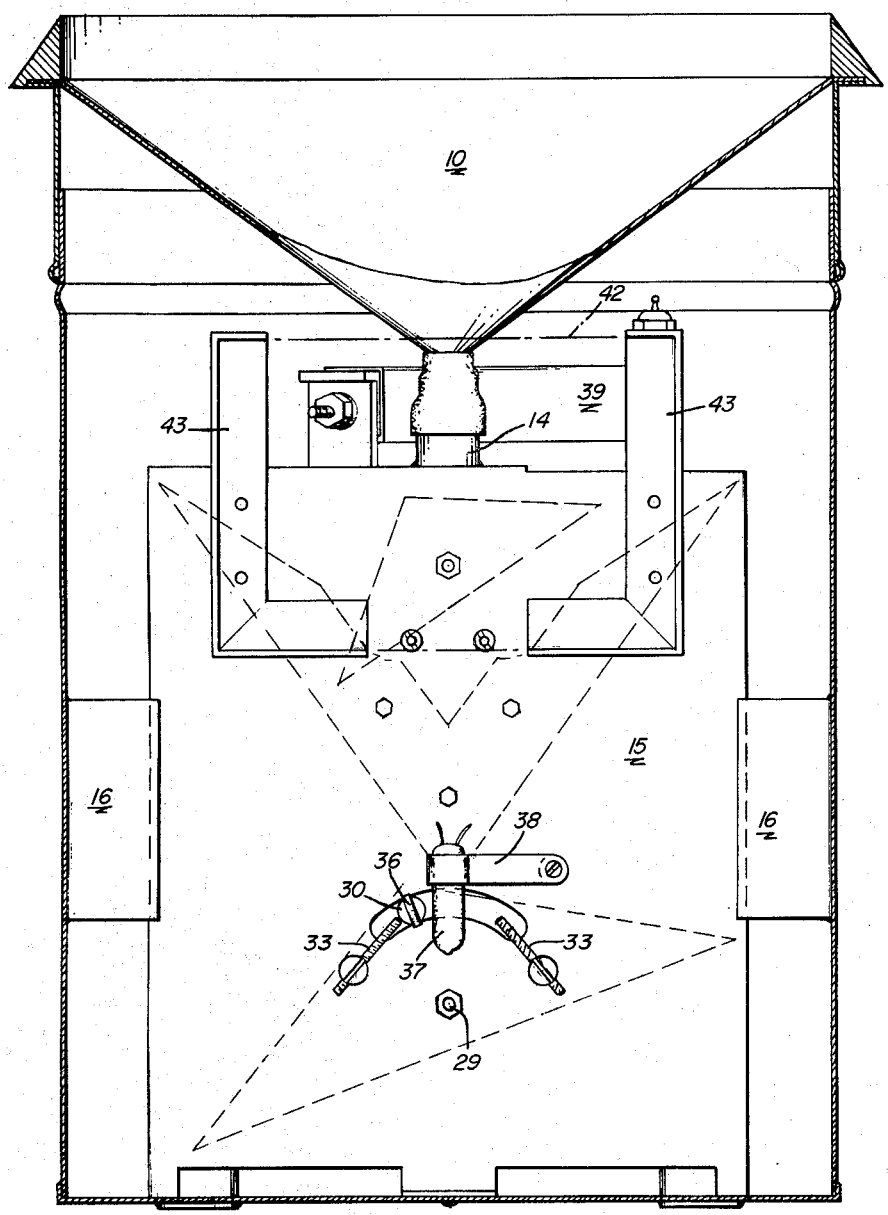
FIG. 4 is a section on line 4—4 of FIG. 2.

The funnel 10 is provided with a nozzle or spout 13 which is received by a nozzle director 14 carried on a support frame 15, located in the casing 9, to carry counting and recording mechanism to be hereinafter described. The support frame 15 comprises a vertically disposed plate which is located in the casing 9 by means of spaced side guides 16 each fixed to the inner wall of said casing. This arrangement enables the counting and recording mechanism to be removed as a unit upon renewal of collecting funnel 10. Pivotally mounted to the support frame 15 beneath the spout 13 are a pair of buckets 17 and 17a of triangular cross-section. The buckets 17 and 17a are of equal capacity and have a common bifurcated partition wall 18 between which the pivot 19 for the said buckets passes. Stop screws 20 are mounted on the frame 15 below said buckets 17 and 17a and are arranged to limit the pivotal tilting movements of the buckets which as shown in FIG. 3 are tilted to the right so that upon the bucket 17 receiving a predetermined amount of rainwater from the collection funnel 10, the buckets will be tilted about their pivot 19 so that the contents of bucket 17 will be discharged and the bucket 17a positioned to receive an equal amount of rainwater. Tilting of the buckets from receiving to discharge positions will continue as long as rain water is being delivered from the funnel 10 through spout 13.

Figure 5:
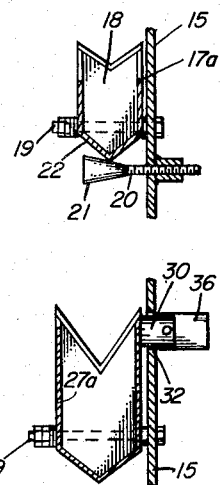
FIG. 5 is a detail section on line 5—5 of FIG. 3.
Figure 7:
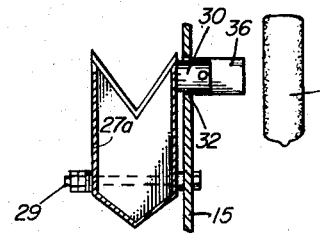
FIG. 7 is a detail section on line 7—7 of FIG. 3.

In order that the tilting movement of the buckets may be adjusted so that equal amounts of rain water will be delivered by each bucket the stop screws 20, as shown in FIG. 5, are provided with conical heads 21, adapted to contact the base sides 22 of the buckets 17 and 17a. As shown the base sides 22 of the buckets are angled to form a gutter so that all the rain water received in the buckets is discharged when each bucket assumes the tilted or inclined position.

The buckets 17 and 17a each discharge their contents into respective arms 23 and 24 of a Y-shaped collection chute 25 having a discharge nozzle 26. The buckets 17 and 17a and collection chute 25, constitute a metering device so that, irrespective of the amount of rain water being delivered through the spout 13, equal and constant amounts of water are discharged by the buckets 17 and 17a through nozzle 26 of the chute 25.

The nozzle 26 delivers the rain water alternately into a second pair of pivotally mounted measuring containers being buckets 27 and 27a which are of larger capacity than buckets 17 and 17a but of the same construction being of triangular cross-section and equal capacity to each other and having a common bifurcated partition wall 28 between which the pivot 29 for the said buckets 27 and 27a passes. At the rear of the measuring buckets 27 and 27a is fixed a stud 30 which extends through an arcuate slot 32 in the support frame 15, said stud contacting adjustable screw stops 33 adapted to enable the tilting movements of the said buckets to be accurately adjusted to ensure that each bucket on receiving a predetermined quantity of water will tilt to a discharge position and locate the other bucket to a receiving position below the nozzle 26.

Each bucket 27 and 27a discharges its contents into a respective discharge pipe 34 located in the bottom of the casing 9, each pipe 34 being closed by a gauze 35 to prevent the entry of insects and foreign matter into the casing.

Figure 6:
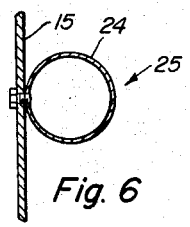
FIG. 6 is a detail section on line 6—6 of FIG. 3.
Figure 2:
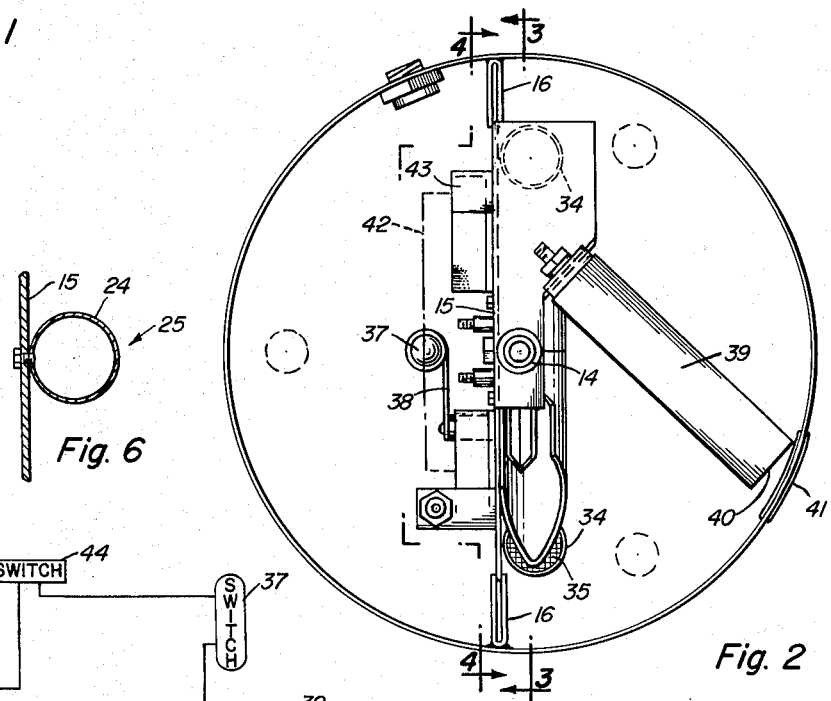
FIG. 2 is a plan view of the casing with the collection funnel removed.

Secured to the stud 30 is a permanent magnet 36 which as it moves, during tilting movements of the buckets 27 and 27a, passes a mercury magnetic switch 37 (of known type) which is supported by clamp 38 on support frame 15. The mercury switch 37 is located centrally of the arcuate movement of the magnet 36 whereby upon each oscillation of the magnet 36, consequent upon the buckets 27 and 27a a filling and discharging, the switch 37 is actuated to close a circuit energising an electric impulse recording counter 39, mounted on frame 15 with the numeral indicating end 40 being positioned to be visible through inspection window 41 in the wall of the casing 9. The counter may be of any well known type and for example, may be a four figure 6 volt ohm counter used in telephone systems.

Figure 8:
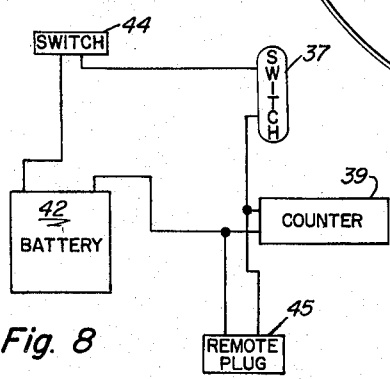
FIG. 8 is a circuit diagram of the counting mechanism included in the gauge.

In FIG. 8 there is shown a diagrammatic circuit for energising the counter 39, in which battery 42 supported in brackets 43 on frame 15, is connected in series with main control switch 44, mercury switch 37 and counter 39. Connected in parallel with the counter 39 is a plug 45 to enable the circuit to be connected to a indicator or recording device (not shown) at a base station. The plug 45 may be connected with socket 46 mounted in the side wall of casing 9 for connection to a land line (not shown) which connects the counter 39 with the remote indicator or recorder and which will be energised simultaneously with the said counter.

In a simplified construction the buckets 17 and 17a and collection chute 25, constituting the metering device, may be omitted in which case the nozzle 13 will direct the rain water from funnel 10 directly into the measuring buckets 27 and 27a.

In operation, and when rain water is collected in funnel 10 it is passed, through nozzle 13, into the uppermost of buckets 17 and 17a. Because of the configuration of the bucket, and the pivotal mounting, the addition of water causes instability and when a predetermined amount of water is received by the bucket it will move about its pivot until it reaches one of the stops 20 when the water therein is discharged into collection chute 25 and the other bucket commences to fill and the process repeated while water is delivered thereto.

The water delivered from the buckets 17 and 17a is discharged through nozzle 26 in the same manner alternately into measuring buckets 27 and 27a which during each oscillation cause energisation of the counter 39 through the magnetic mercury switch 37.

If the buckets have been calibrated to hold a certain quantity of water before each bucket moves to the discharge position, a reading of the number of full buckets will give a reading of the amount of water collected by the gauge which can be again calibrated to give a reading of the actual rainfall, at the point where the gauge is located. An obvious quantity for which to calibrate each measuring bucket 27 and 27a is 0.01" i.e. one point of rain. The four figure counter 39 may then measure and record directly 100" of rain.

The coarse calibration is effected by making the buckets 27 and 27a the size that is necessary, and the fine calibration by adjusting the positions of the stop screws 33 on the frame 15 and arranged to contact the stud 30 on the said buckets so that as each bucket tips from one position to the other when the amount of water in either is equivalent to one point of rain.

The window 41 is fitted to the side of the container to permit reading of the counter to thereby give a direct reading of the rainfall, to the nearest point.

The metering device mounted beneath the spout 13 of the funnel 10 and consisting of buckets 17 and 17a and delivery chute 25 is adapted to intermittently deliver equal amounts of rain water to the measuring buckets 27 and 27a forming part of the measuring and counting mechanism of the rain gauge.

The metering device has been provided to overcome slight registration errors in areas subject to frequent falls of both heavy and light rain.

The buckets 27 and 27a could be set to register light rainfall quite accurately, but would under-register heavy falls with this setting. Similarly if set to correctly register heavy rain would over-register light rainfalls.

This arises from the fact that heavy rainfall builds up a slight pressure due to accumulated rain in the catchment funnel 10. This pressure forces the water into the tilting bucket and registration losses will occur.

When only light rain is falling, no pressures are built up in the rain gauge and water passes into the tilting measuring bucket mechanism under the force of gravity only. This variation in the rate of pressure of water passing into the measuring bucket mechanism is the source of the registration errors referred to above. The metering buckets 17 and 17a are preferably about one third the capacity of the measuring buckets 27 and 27a. The stops 33 obviously may be adjusted to cause the measuring buckets to discharge after receiving a quantity of water equal to the capacity of each metering bucket times a predetermined whole number greater than one.

In this manner equal amounts of rain water are delivered intermittently from the buckets 17 and 17a so that regardless of pressures built up in the gauge funnel 10, the measuring buckets 27 and 27a of the recording mechanism receive equal measured amounts of water at equal pressure so that the measuring buckets can be accurately set to measure and record rainfall without being subject to error arising from intensity of precipitation.

It is apparent that a unit of this type can be left unattended for as long as necessary or until the time when the dry cell is so discharged as not to be able to energise the counter.

The apparatus above described is for a rain precipitation gauge, however, by the application of a larger collection funnel incorporating a heater the apparatus may be used to record snow-fall. The heated collection funnel converts the collected snow to water and the measuring and recording mechanism operates in the manner above described.

The claims defining the invention are as follows:

1. An automatic measuring and recording gauge for rain or like precipitation, a rain water collection funnel, a metering mechanism including first means receiving water from the funnel for discharging the water in a batch of a predetermined volume when said batch has been accumulated therein, and including funnel means receiving water from the first means and restrictive orifice means for discharging the water from the funnel means in a restricted, metered flow at a predetermined point, a first measuring container having an imperforate portion of a volume greater than said predetermined volume and a discharge opening, a second measuring container having an imperforate portion of a volume greater than said predetermined volume and a discharge opening, pivot means mounting each of the containers pivotally below said point for alternate movement to a receiving position adapted to receive water from the metering means in which the discharge opening is above the imperforate portion thereof and a discharge position in which the discharge opening thereof is below the imperforate portion thereof to completely drain the container, the pivot means mounting the containers in counterbalancing relationship in which each of the containers, when in its discharge position, holds the other container in its receiving position until the imperforate portion of the last-mentioned container is substantially filled with water, stop means for locating the extreme positions of the containers so that the containers pivot from one extreme position to the other extreme position when the container which is receiving water has received and is holding a volume of water greater than said predetermined volume so that receipt of more than one batch by the container receiving water is required to pivot the containers, and indicating means operable by movement of each container from its receiving position to its discharge position.

2. An automatic measuring and recording rain gauge as claimed in claim 1 in which the measuring containers are in the form of two triangular section containers of substantially equal capacity mounted with the pivot positioned between said containers and arranged for one container upon receiving a predetermined quantity of water therein at a receiving position to move about the pivot to a discharge position to discharge all of said water in said discharge position, the other container thereby moving from the discharge position to return to the receiving position.

3. An automatic measuring and recording rain gauge as claimed in claim 1 wherein the metering mechanism comprises two buckets of substantially equal capacity smaller than that of the measuring containers and mounted on each side of a common pivot and arranged to move about said pivot from receiving positions to discharge positions in the same manner as the measuring containers, said buckets being positioned to alternately receive water delivered from the collection funnel, and alternately discharge the water through the metering means, whereby the water is metered to the measuring containers.

4. An automatic measuring and recording rain gauge as claimed in claim 3 having adjustable stop means for adjustably limiting the movement of the buckets, said stop means including a pair of tapered members and means for moving said tapered members across the paths of said buckets to vary the distance of travel of said buckets.

5. An automatic measuring and recording rain gauge as claimed in claim 1 wherein the indicating means including a counting mechanism, contact means operated by the measuring containers comprising a permanent magnet carried by the measuring containers and movable therewith, and a magnetically operable switch connected in circuit with the counting mechanism and supported in a fixed position, said magnet and switch being arranged so that the switch is closed to energise the counting mechanism each time the measuring containers move from the receiving position to the discharge position.

6. An automatic measuring and recording rain gauge as claimed in claim 5 wherein the magnetically operable switch is a magnetic mercury switch in series circuit with a battery and the counting mechanism.

7. An automatic measuring and recording rain gauge as claimed in claim 6 including a gauge casing having support guides and a supporting frame and wherein the measuring containers, switch, counting mechanism and energising battery are all carried on the supporting frame and removable as a unit from the support guides in the gauge casing.

8. An automatic measuring and recording rain gauge as claimed in claim 7 wherein the rain collecting funnel is provided with a spout and a spout director is fixed to the removable supporting frame and the spout of the rain collecting funnel detachably engages the spout director.

9. In an automatic gauge for measuring rain or like precipitation, a precipitation collecting funnel, first and second containers each when in a receiving position adapted to receive water from the funnel, first mounting means mounting the first and second containers for alternate pivotal movement of the first container to the receiving position from a discharge position only when the second container receives a predetermined quantity of water and overbalances the first container and for alternate movement of the second container from a discharge position to the receiving position only when the first container receives said predetermined quantity of water and over balances the second container, each of the first and second containers serving to discharge completely when in the discharge position thereof, third and fourth containers each of a predetermined volume several times that of each of the first and second containers, second mounting means mounting the third and fourth containers for alternate pivotal movement of one of the third and fourth containers from a receiving position adapted to receive all the water from the first and second containers to a discharge position and overbalance the other of the third and fourth containers and move it from a discharge position to the receiving position thereof only after receiving a predetermined whole number of discharges of the first and second containers, and indicating means operable by movement of each of the third and fourth containers to the discharge position thereof.

10. The automatic gauge of claim including flow controlling means metering flow from the first and second containers to the third and fourth containers.

References Cited by the Examiner

UNITED STATES PATENTS

| | | | |
|---|---|---|---|
| 2,202,452 | 5/1940 | Hildabrand | 73—171 |
| 2,251,352 | 8/1941 | Cornick | 73—171 |
| 2,637,792 | 5/1953 | Cushman | 200—87.3 X |
| 2,789,431 | 4/1957 | Wong | 73—171 |

LOUIS R. PRINCE, *Primary Examiner.*

JOSEPH P. STRIZAK, RICHARD C. QUEISSER,
*Examiners.*